United States Patent [19]

Bogaerts et al.

[11] Patent Number: 5,018,228
[45] Date of Patent: May 28, 1991

[54] BRAKE LATHE WITH HAND-HELD GRINDER AND METHOD OF GRINDING

[75] Inventors: Leo C. Bogaerts, Antioch; David Cattapan, Mount Prospect, both of Ill.

[73] Assignee: Ammco Tools, Inc., North Chicago, Ill.

[21] Appl. No.: 9,915

[22] Filed: Feb. 2, 1987

[51] Int. Cl.$^5$ .............................................. B24B 23/00
[52] U.S. Cl. ...................................... 51/259; 51/132; 51/DIG. 3; 51/170 T; 51/281 SF
[58] Field of Search ................... 51/132, DIG. 3, 259, 51/247, 180, 181, 170 T, 260–261, 258, 281 SF, 327

[56] References Cited

U.S. PATENT DOCUMENTS

| | | | |
|---|---|---|---|
| 1,221,798 | 4/1917 | Greenamyer | 51/259 |
| 1,229,496 | 6/1917 | Matula | 51/260 |
| 1,971,790 | 8/1934 | Mall | 51/170 T |
| 3,456,401 | 7/1969 | Kushmuk | 51/259 |
| 3,656,920 | 4/1972 | Helms | 51/170 PT |

FOREIGN PATENT DOCUMENTS 0208137 12/1923 United Kingdom .................. 51/259

*Primary Examiner*—Robert A. Rose
*Attorney, Agent, or Firm*—Edmond T. Patnaude

[57] ABSTRACT

A hand-held grinder for applying a swirl finish to a brake disc mounted to a lathe spindle is driven through a flexible drive removably mounted to the end of the lathe spindle.

3 Claims, 1 Drawing Sheet

BRAKE LATHE WITH HAND-HELD GRINDER AND METHOD OF GRINDING

The present invention relates in general to a method and apparatus for surfacing brake discs, and it relates to a new and improved brake lathe including a hand-held disc grinder which is driven by the lathe spindle through a flexible drive connected to one end of the spindle.

BACKGROUND OF THE INVENTION

The planar surfaces of brake discs and other rotors are commonly ground flat by means of a motor driven grinding attachment mounted on the lathe housing. A grinding attachment of this type is described in U.S. Pat. No. 3,456,401 assigned to the assignee of the present invention.

In order to provide a swirl-like finish on the braking surfaces of a brake disc mounted on the lathe spindle, the prior art grinder attachment must be mounted to the lathe in proximity to the brake disc and is actuated to rotate the grinding disc while the brake disc is being rotated by the lathe. A considerable amount of set-up time is thus required to use such an attachment, and only a single swirl pattern can be obtained, it being dependent on the relative angular velocities of the brake disc and the grinder attachment. It would be desirable to reduce this set-up time, to enable the operator to select different swirl finishes, and also to reduce the manufacturing cost of the grinder attachment.

SUMMARY OF THE INVENTION

Briefly, there is provided in accordance with the teachings of the present invention a hand-held grinder attachment for a lathe, the grinder being removably coupled to the distal end of the spindle of the associated lathe by means of a flexible drive. Consequently, the need for a separate motor for the grinder is eliminated and the ratio of the speed of the grinding disc to the speed of the disc to be ground remains constant irrespective of the actual speed of the spindle or of changes in the speed of the spindle, wherefor a single swirl patter is provided.

In accordance with another aspect of the invention the grinder attachment includes a transmission having a plurality of manually settable predetermined step-up ratios which enables the operator to preselect a preferred swirl pattern.

In use, a swirl finish is ground on the braking surfaces of a brake disc by mounting the disc to the spindle, coupling the flexible drive to the end of the spindle, then operating the lathe to rotate the spindle and the grinder attachment and then holding the face of the rotating grinding disc against one braking surface of the rotating brake disc. After the desired finish has been provided on the one face of the brake disc the operator then holds the same face of the rotating grinding disc against the other face of the brake disc to provide the desired swirl finish thereon. It will thus be seen that no additional set-up time is required before finishing the second braking surface of the brake disc.

GENERAL DESCRIPTION OF THE DRAWING

Further objects and advantages and a better understanding of the present invention will be had by reference to the following detailed description taken in connection with the accompanying drawings wherein:

FIG. 1 is a fragmentary elevational view of a lathe and grinder attachment embodying the present invention; and FIG. 2 is an elevational view, similar to FIG. 1, showing the grinder attachment in use.

DETAILED DESCRIPTION OF A PREFERRED EMBODIMENT

Figure 1:
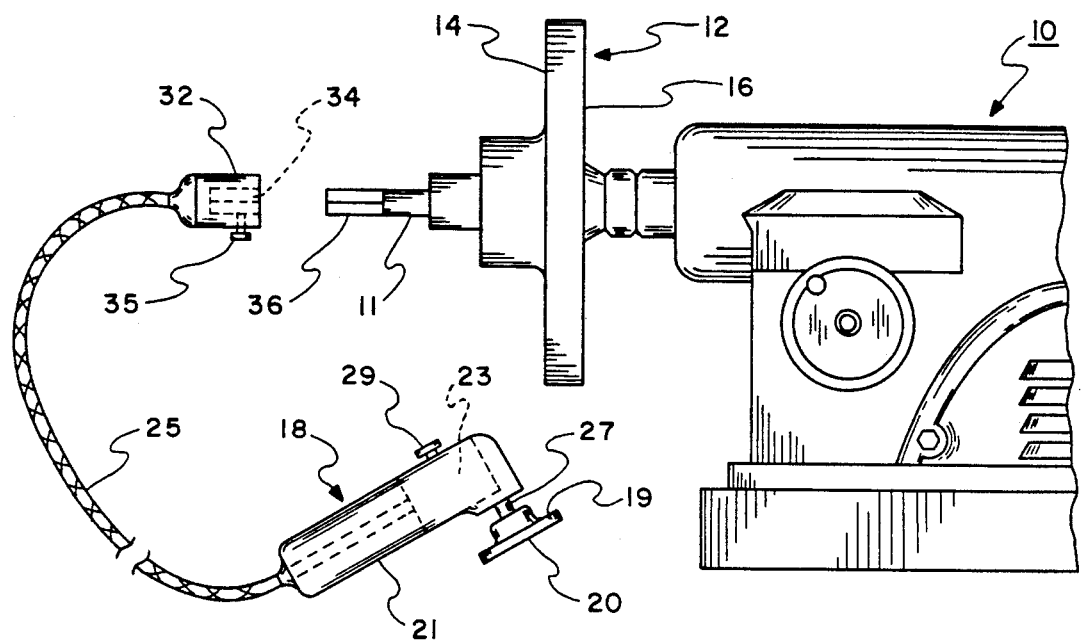

Referring to the drawing there is shown a portion of a lathe 10 which includes a spindle 11 to which is mounted a brake disc 12 having annular planar braking surfaces 14 and 16 which are adapted to be frictionally engaged by brake pads (not shown) when the disc 12 is mounted on an automotive vehicle.

It is desirable to provide a swirl-like finish on the planar faces 14 and 16 of the brake disc and for that purpose there is provided in accordance with the present invention a hand-held grinder 18 which includes a grinding disc 19 having an abrasive planar surface 20 on the face of the disc 19. The grinder 18 includes a housing 21 which is adapted to be held in the hand of the user, and mounted within the housing is a conventional transmission 23 which couples a flexible drive cable 25 to the output shaft 27 of the grinder. The transmission provides a manually adjustable speed ratio between the speed of rotation of the flexible cable 25 and the shaft 27 and includes a manually settable knob 29 for adjusting the speed ratio.

One end of the drive cable 25 is connected to the input of the transmission 23 and the other en of the drive cable 25 is provided with a female socket 32 having a non-circular recess 34 therein and a manual lock screw 35 for securing the socket 32 to a complementary male drive member 36 provided at the distal end of the lathe spindle 11.

Figure 2:
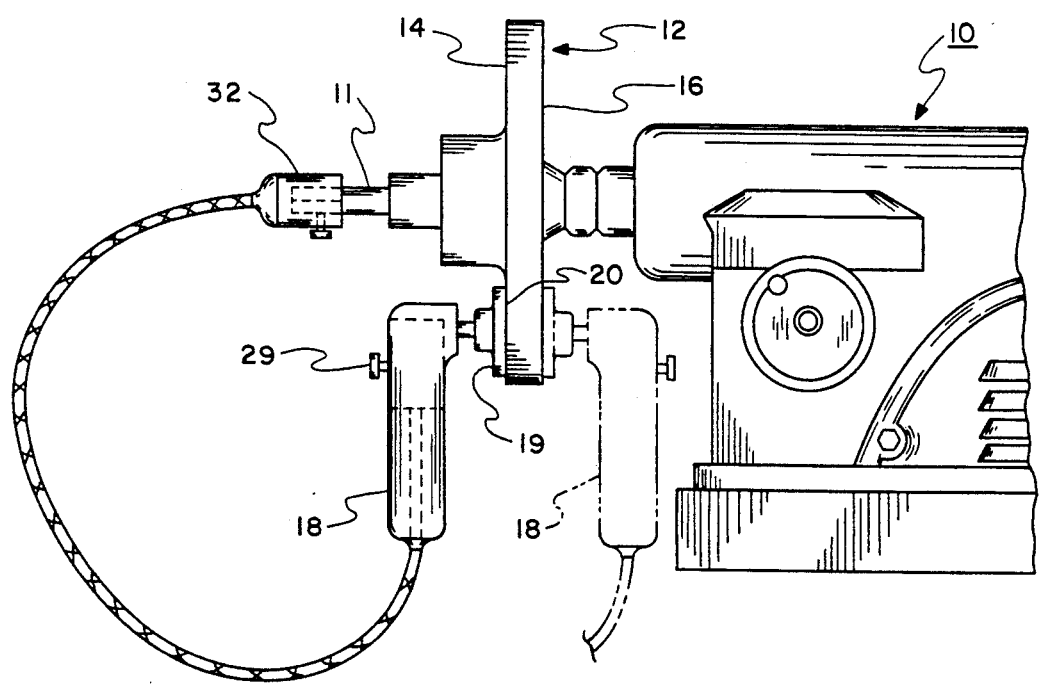

With the socket 32 attached to the spindle 11 as shown in FIG. 2, when the lathe is operated to rotate the spindle 11 and thus the brake disc 12, the grinding disc 19 is also rotated. The operator then holds the grinder attachment in the position shown in solid lines in FIG. 2 with the planar abrasive face 20 of the grinding disc flat against the planar face 14 of the brake disc 12. The actuator 29 can be used to adjust the speed of the grinding disc 19 relative to the brake disc 12 to provide the desired swirl finish. After the desired swirl finish has thus been ground on the face 14 of the disc 12 the operator simply places the grinder 18 in the position shown in phantom in FIG. 2 and then grinds the face 16 of the disc 12. It will be appreciated by those skilled in the art that the setup time for providing the swirl finish on the disc 12 is very short since all that is required is to connect the adaptor 36 to the end of the lathe spindle 11 if it is not already connected and to place the socket 32 over the distal end thereof.

While the present invention has been described in connection with the particular embodiment thereof, it will be understood by those in the art that many changes may be made without departing from the true spirit and scope of the present invention. Therefore, it is intended by the appended claims to cover all such changes and modifications which come within the true spirit and scope of this invention.

What is claimed:

1. Apparatus for grinding for the planar braking surfaces of a brake disc mounted for rotation on the spindle of a lathe, comprising in combination a hand-held grinder attachment having
a housing, a transmission mounted in said housing, said transmission having a rotatable input and a rotatable output, and an abrasive grinding disc mounted to said output, a flexible drive cable connected at one end to said rotatable input of said transmission, and cooperable means provided respectively at the other end of said flexible drive cable and at the distal end of said spindle coupling said drive cable t said spindle for rotation of said cable in unison with said spindle.

2. Apparatus for grinding as set forth in claim 1 wherein said cooperable means comprises a first fitting affixed over said distal end of said spindle, and second fitting affixed over said other end of said flexible cable, and said first and second fittings being removably connected together.

3. A method of grinding the planar braking surfaces of a brake disc, comprising the steps of mounting said brake disc to the spindle of a lathe with said planar braking surfaces being perpendicular to the axis of rotation of said spindle.

providing a hand-held grinder having a rotatable grinding disc having a planar abrasive surface thereon, providing a first fitting at the distal end of said spindle closest to said braking disc, providing at the end of said flexible cable opposite said grinder attachment a second fitting complimentary to said first fitting, coupling said first and second fittings together, causing said spindle to be rotated to rotate said brake disc and to rotate said grinding disc through said flexible cable, grasping said grinder in the hand and pressing said abrasive surface against one of said braking surfaces with the planes of said abrasive surface and of said one of said braking surfaces in mutually parallel relationship, and then pressing said abrasive surface against the other one of said braking surfaces with the planes of said abrasive surface and of said other one of said braking surfaces in mutually parallel relationship.

* * * * *

UNITED STATES PATENT AND TRADEMARK OFFICE
CERTIFICATE OF CORRECTION

PATENT NO. : 5,018,228
DATED : May 28, 1991
INVENTOR(S) : Bogaerts et al.

It is certified that error appears in the above-identified patent and that said Letters Patent is hereby corrected as shown below:

Column 2, line 64, delete the second occurrence of "for"

Column 3, line 9, change "t" to - to -

Column 3, line 16, before "second" insert - a -

Signed and Sealed this

Thirteenth Day of October, 1992

Attest:

DOUGLAS B. COMER

*Attesting Officer*   Acting Commissioner of Patents and Trademarks